US008161610B2

(12) United States Patent
Weaver

(10) Patent No.: US 8,161,610 B2

(45) Date of Patent: Apr. 24, 2012

(54) RETAINING TOOL FOR EXHAUST BRAKE POWER PISTON AND METHOD OF USE

(75) Inventor: Kendall Weaver, Clinton, UT (US)

(73) Assignee: RKR Ventures, LLC, Salt Lake City, UT (US)

( * ) Notice: Subject to any disclaimer, the term of this patent is extended or adjusted under 35 U.S.C. 154(b) by 430 days.

(21) Appl. No.: 12/430,770

(22) Filed: Apr. 27, 2009

(65) Prior Publication Data

US 2009/0265905 A1 Oct. 29, 2009

Related U.S. Application Data

(60) Provisional application No. 61/048,523, filed on Apr. 28, 2008.

(51) Int. Cl.
*B23P 19/04* (2006.01)

(52) U.S. Cl. .................................................... 29/213.1

(58) Field of Classification Search ................. 29/213.1, 29/215; 123/90.39, 90.47
See application file for complete search history.

(56) References Cited

U.S. PATENT DOCUMENTS 1,879,024 A * 9/1932 Barto, Jr. .................... 29/213.1
2,643,447 A * 6/1953 Wright .......................... 29/213.1
2,882,591 A * 4/1959 Grossman .................... 29/213.1
3,011,249 A * 12/1961 Apple et al. ................. 29/213.1
3,873,067 A 3/1975 Carpio et al.
4,259,931 A * 4/1981 Clark et al. ............... 123/198 R
4,488,520 A 12/1984 Almor
4,598,674 A 7/1986 Nono et al.
4,676,203 A 6/1987 Nouno
5,593,196 A * 1/1997 Baum et al. .................. 294/174
6,047,675 A 4/2000 Kunz
6,491,012 B2 12/2002 Pryba et al.
6,543,402 B2 4/2003 Burns
7,350,490 B2 * 4/2008 Mock et al. ................ 123/90.39
2008/0034928 A1 * 2/2008 Sheu ............................ 81/177.1
* cited by examiner

*Primary Examiner* — David B Thomas
(74) *Attorney, Agent, or Firm* — Bateman IP

(57) ABSTRACT

A retaining clip fits on the exhaust rocker arms of a large diesel engine to hold the exhaust brake power pistons in place while performing service on the engine. The retaining clips are easily installed and removed from the rocker arm and prevent the loss or damage of the power piston due to the piston accidentally falling out of the rocker arms during service to the engine.

12 Claims, 5 Drawing Sheets

RETAINING TOOL FOR EXHAUST BRAKE POWER PISTON AND METHOD OF USE

PRIORITY

The present application claims the benefit of U.S. Provisional Application Ser. No. 61/048,523, filed Apr. 28, 2008, which is expressly incorporated herein by reference in its entirety.

THE FIELD OF THE INVENTION

The present invention relates to a tool for servicing large diesel engines used in road tractors (semi trucks). More specifically, the present invention relates to a clip for securing the power piston located in the exhaust valve rocker arm and used for engine braking purposes in modern Volvo® and similar large diesel engines.

BACKGROUND

The large Volvo® and similar diesel engines used in road tractors (herein referred to simply as a diesel engine) utilize an engine brake to aid in slowing the vehicle. The engine brake in modern diesel engines utilizes a brake rocker arm with additional cam shaft lobes to selectively open and close the exhaust valves. The brake rocker arm interacts with the exhaust valve rocker arm via a pump piston and power piston to operate the engine brake. During normal operation, the pump piston and power piston are provided with low pressure engine oil and are thus in a collapsed state. To effect operation of the engine brake, an oil control valve increases the pressure of oil provided to the pump piston and power piston such that the brake rocker arm pressing on the pump piston causes expansion of the power piston and thus causes the exhaust valves to open.

One problem with the present engine brake system is that the various parts associated with the power piston are not captively held inside of the exhaust rocker arm and can fall out of the rocker arm while servicing the engine. A variety of types of service to the head of the engine such as removal of the head, service to the valve train, or service or replacement of the fuel injectors or injector seals would allow the power piston to fall out of the exhaust rocker arm. This would result in lost time to reassemble the power piston and may result in lost or damaged parts.

The factory service procedures for these engines instruct the service technician to place a rubber band around the power piston to keep it from falling out of the exhaust rocker arm. The rubber band, however, is difficult for the technician to use, does not hold up well to the oil and other chemicals present in the engine, and may damage the engine if the technician forgets to remove the rubber band after servicing the engine. If used, the rubber band may weaken and break due to the oils and solvents used in service and operation of the engine. This may cause the power piston and associated parts to fall out of the rocker arm and be lost or damaged, in addition to increasing the time to service the engine. If the technician forgets to remove the rubber band after performing the desired engine service, the rubber band may interfere with the operation of the engine and may clog oil passages or other parts of the engine, causing damage to the engine. This may occur as the rubber band collects oil and becomes more difficult to see while service is being performed.

There is a need for a tool which is suitable for retaining the power piston in large diesel engines while servicing these engines. There is a need for a tool which is easy to use and reliably prevents the power piston from falling out of the exhaust valve. There is also a need for a tool which is readily visible and which is not easily left in the engine after completing the engine service.

SUMMARY OF THE INVENTION

It is an object of the present invention to provide an improved retaining tool for the exhaust brake power piston of large diesel engines.

According to one aspect of the invention, a retaining tool is provided which is easily secured to the exhaust valve of an engine to secure the engine brake power valve during engine maintenance. According to another aspect of the invention, the retaining tool may be highly visible so as to reduce the likelihood that a technician accidentally leaves the tool in the engine.

These and other aspects of the present invention are realized in a retaining tool as shown and described in the following figures and related description.

BRIEF DESCRIPTION OF THE DRAWINGS

Various embodiments of the present invention are shown and described in reference to the numbered drawings wherein.

It will be appreciated that the drawings are illustrative and not limiting of the scope of the invention which is defined by the appended claims. The embodiments shown accomplish various aspects and objects of the invention. It is appreciated that it is not possible to clearly show each element and aspect of the invention in a single figure, and as such, multiple figures are presented to separately illustrate the various details of the invention in greater clarity. Similarly, not every embodiment need accomplish all advantages of the present invention.

DETAILED DESCRIPTION

The invention and accompanying drawings will now be discussed in reference to the numerals provided therein so as to enable one skilled in the art to practice the present invention. The drawings and descriptions are exemplary of various aspects of the invention and are not intended to narrow the scope of the appended claims.

Figure 1:
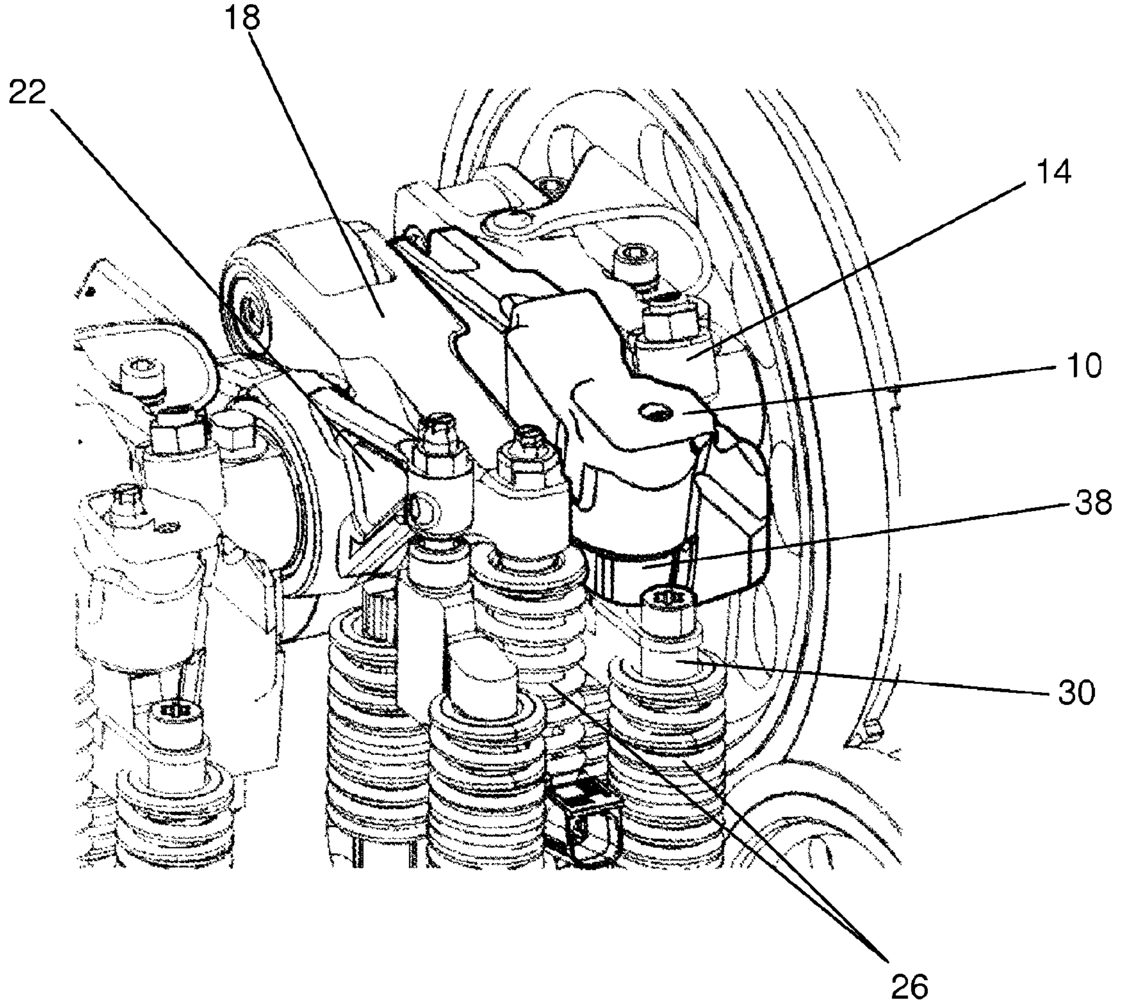
FIG. 1 shows a perspective view of a portion of the valve train of a diesel engine.

Turning now to FIG. 1, a perspective view of a valve train of a diesel engine is shown. The valve train includes an exhaust rocker arm 10, engine brake rocker arm 14, fuel injector rocker arm 18, and intake rocker arm 22. The exhaust rocker arm 10 moves the exhaust valves (not clearly visible but located inside of the exhaust valve springs 26) via an exhaust valve bridge 30. The exhaust valve bridge 30 allows a single exhaust rocker arm 10 to move two exhaust valves. The exhaust rocker arm 10 applies force to the exhaust valve bridge 30 via a power piston 34 (FIG. 2) and a poppet 38. Raising the oil pressure to the power piston 34 and pump piston 42 (FIG. 2) causes the exhaust brake rocker arm 14 to press against the pump piston to thereby inflate the power piston 34 and cause engine braking.

Figure 2:
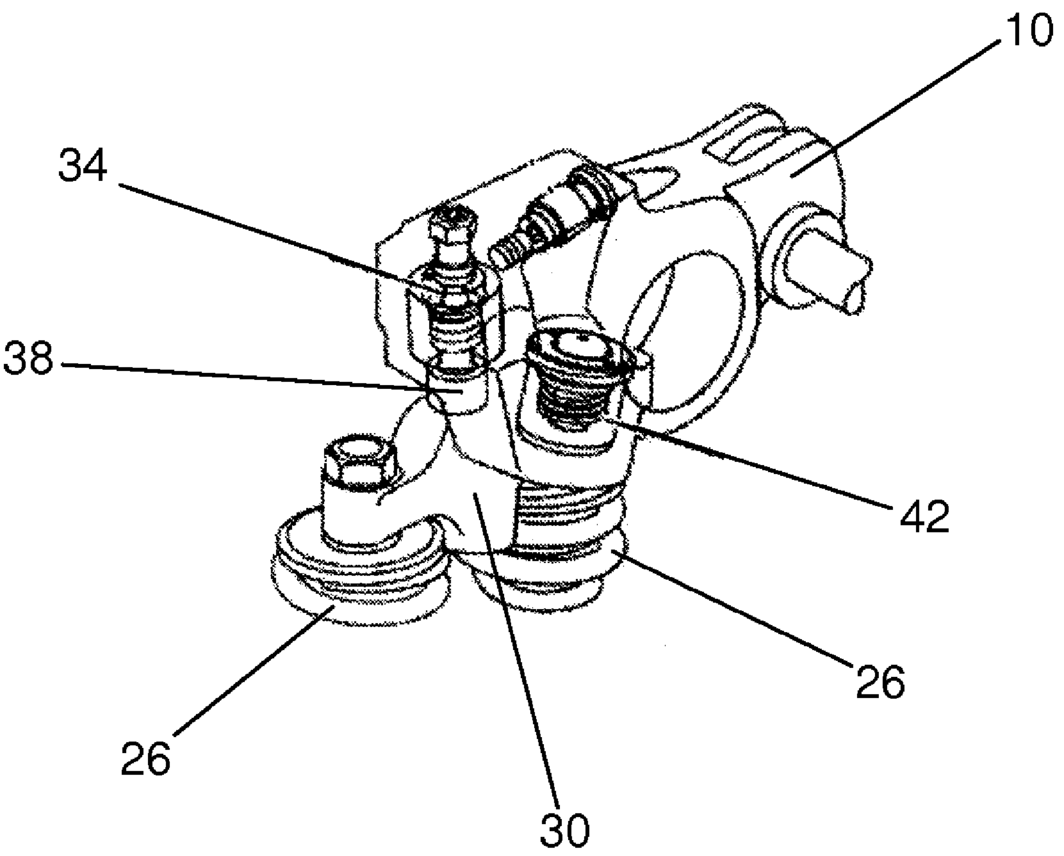
FIG. 2 shows a perspective view of the exhaust rocker arm of FIG. 1.
Figure 3:
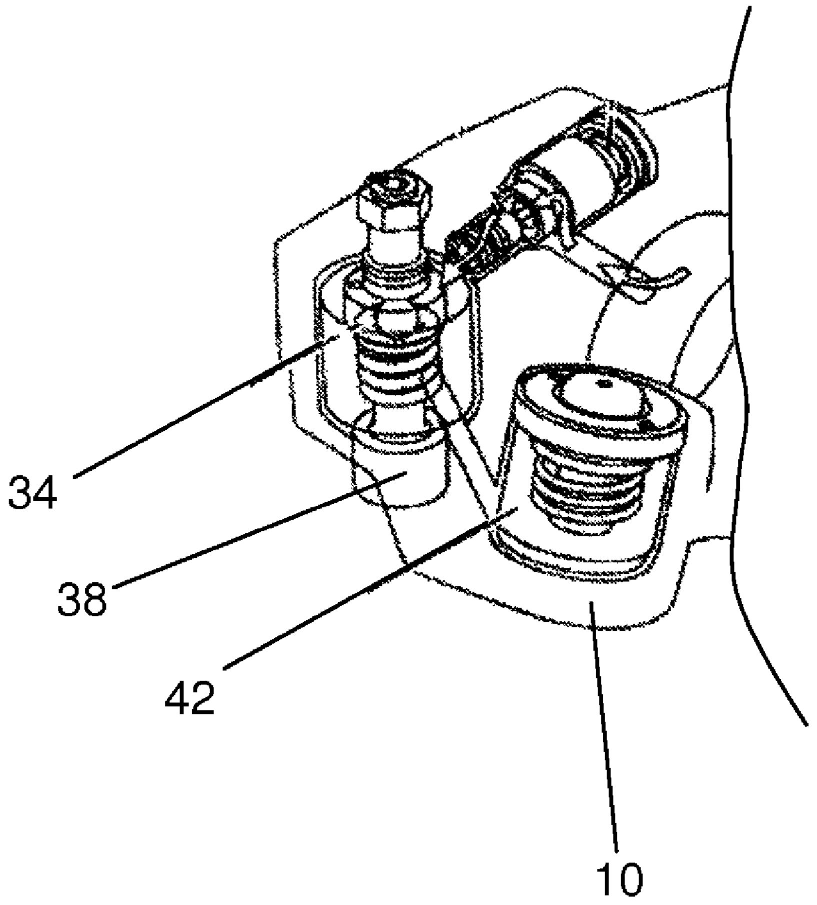
FIG. 3 shows another perspective view of the exhaust rocker arm of FIG. 1.

FIGS. 2 and 3 show partially transparent views of the exhaust rocker arm 10, illustrating the internal components such as the power piston 34 and pump piston 42. The power piston 34 and pump piston 42 are hydraulically connected via a passage, and pressing on the pump piston will inflate the power piston when they are filled with oil. The engine brake rocker arm 14 will press on the pump piston 42 as discussed.

The power piston 34 and poppet 38 are not captively held in the exhaust rocker arm 10, and will fall out of the rocker arm if not held in place. Removal of the heads and other engine service will remove the pressure on the power piston 34 and poppet 38 and allow them to fall out of the exhaust rocker arm as discussed. Servicing the head of the diesel engine is thus more difficult as special care and attention must be paid to the power piston 34 and poppet 38. If these parts fall out, they may be lost or damaged, or dirt or other contaminants may get into the power piston 34. If the power piston 34 and poppet 38 fall out and are not noticed, the valve train will not function properly and further damage to the engine may occur.

As mentioned, technicians often place a rubber band around the exhaust rocker arm 10, power piston 34, and poppet 38 to keep the power piston and poppet in place. There are several disadvantages to this. The rubber band is difficult to place around the power piston 34 and exhaust rocker arm 10. Furthermore, the rubber band may slip off of the rocker arm 10 and release the power piston 34, allowing the power piston to fall out of the rocker arm. Rubber bands are adversely affected by engine oils and other chemicals, and may break or leave debris in the engine. Additionally, rubber bands may be easily missed when reassembling the engine and left in the engine where they may damage the engine.

Figure 4:
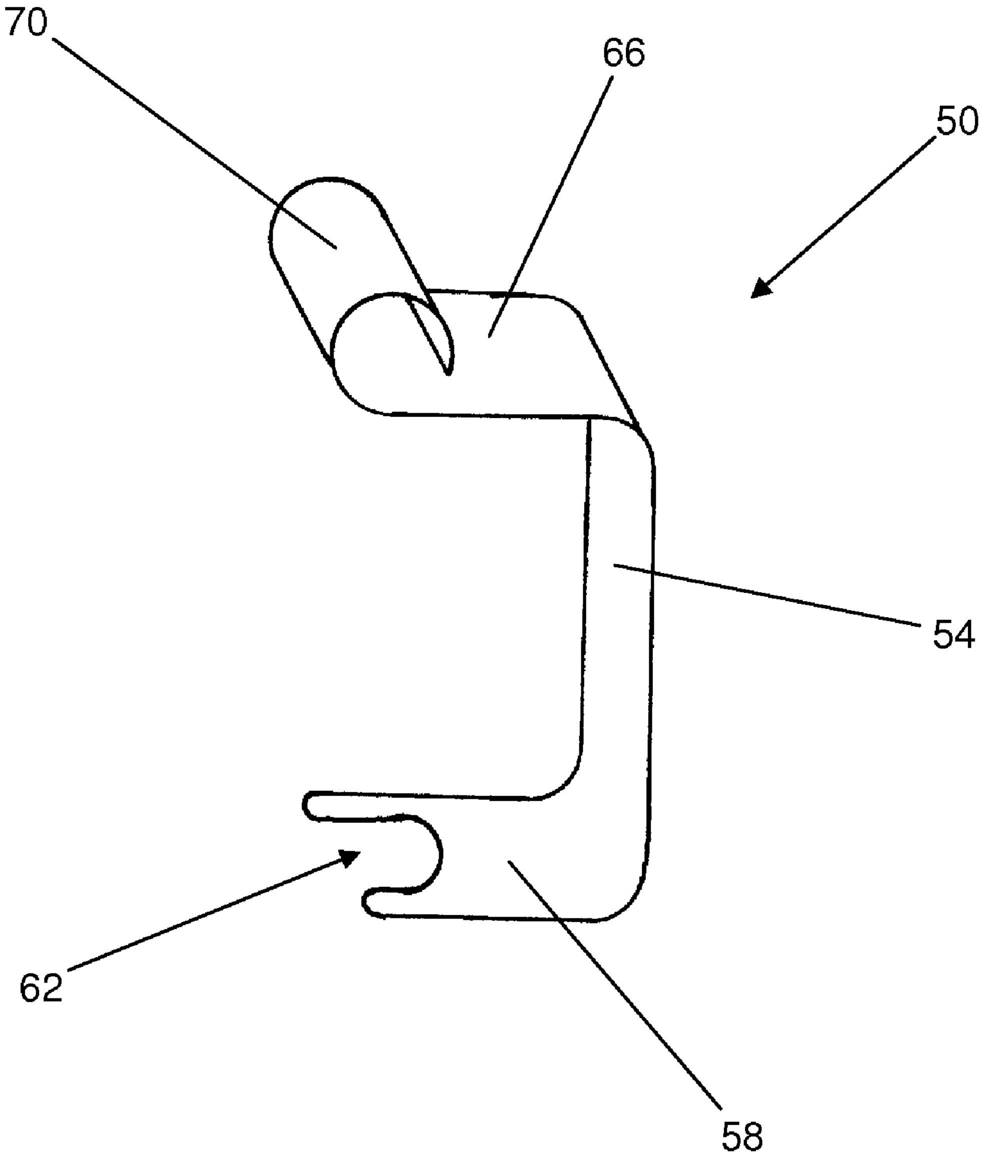
FIG. 4 shows a perspective view of a retaining clip of the present invention.

Turning now to FIG. 4, a perspective view of a retaining clip 50 of the present invention is shown. The clip 50 is formed with a generally C-shaped body 54 which is configured to extend around the exhaust rocker arm 10. The lower portion 58 of the body 54 has an opening or slot 62 formed therein. The slot 62 is shaped to fit between the power piston 34 and poppet 38. The upper portion 66 of the body 54 extends generally parallel to the lower portion 58, and fits over the top of the exhaust rocker arm 10. The upper portion 66 of the body 54 includes a finger grip 70 which allows a technician to more easily insert and remove the clip 50. The finger grip 70, as well as other portions of the clip 50 such as the upper portion 66 or even the entire clip may be painted a high visibility color to make it less likely that the clip 50 is left in the diesel engine after servicing the engine.

Figure 5:
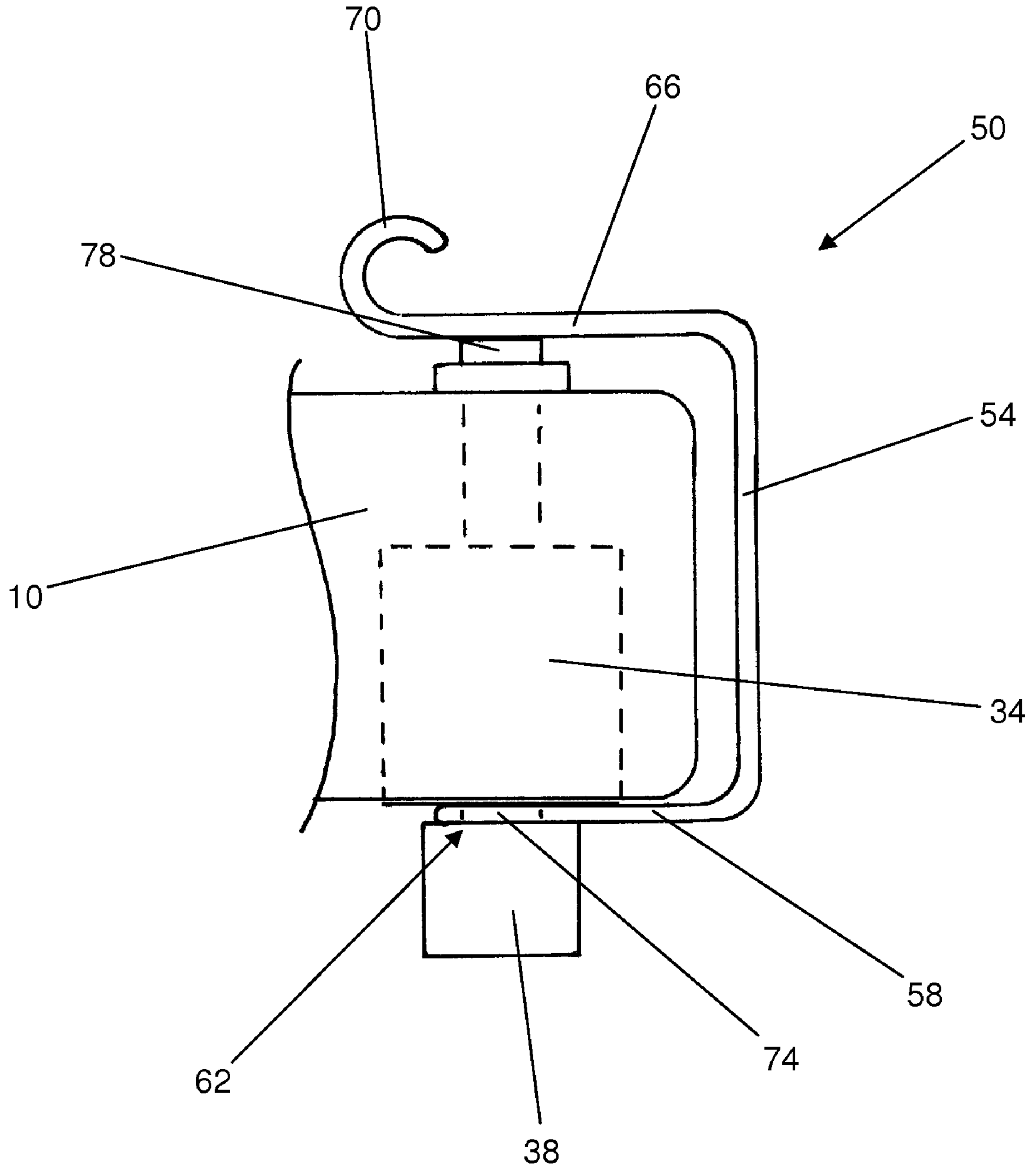
FIG. 5 shows a side view of the retaining clip and exhaust rocker arm.

Turning now to FIG. 5, a side view of a portion of the exhaust rocker arm 10 with the clip 50 in place is shown. Many parts of the valve train have been omitted for clarity. The clip 50 is easily placed on the exhaust rocker arm 10 by placing the slot 62 around the stem 74 between the power piston 34 and poppet 38 and by placing the upper portion 66 of the clip 50 on top of the rocker arm 10. The upper portion 66 may rest on a valve lash adjustment bolt 78 and not directly on the rocker arm 10 in many diesel engines. The C-shaped body 54 of the clip extends around the end of the exhaust rocker arm 10 as shown.

The clip 50 is made from a resilient material such as spring steel and is sized for a particular engine so that a technician must flex the clip slightly to increase the distance between the slot 62 and the upper portion 66 during installation onto an exhaust rocker arm 10. This stretching of the clip places some compression on the power valve 34 and keeps the power valve from falling out of the exhaust rocker arm 10 during service. Thus, the finger grip 70 makes it easier for a technician to stretch the clip 50 slightly and install the clip on the rocker arm 10. The finger grip 70 also makes it easier to grip the clip 50 in order to remove the clip.

When servicing the head of a diesel engine, a technician would remove the engine valve cover. At this point, the valve train is visible and accessible to the technician. The technician would then place a clip 50 on each exhaust rocker arm 10. As there is typically a single exhaust rocker arm 10 per cylinder and six cylinders in a diesel engine, six clips 50 are typically required. Once the clips 50 are in place, the technician may remove or service the head without fear of the power pistons 34 falling out of the head.

The clips 50 are advantageous because they are easily and quickly installed on the exhaust rocker arms 10. The six clips 50 may easily be installed and removed in less than a minute. Using the clips 50 may save twenty minutes or more when working on the head of the diesel engine. Additionally, the clips are more secure than using rubber bands or other means of retaining the power pistons 34, eliminating the worry about the power pistons coming loose during the service procedure. Painting all or a portion of the clips in a bright color such as yellow or orange makes them easily visible to the mechanic and easily recognized as something which is not a permanent part of the engine. This virtually eliminates the possibility that a clip is left in the engine, and thus virtually eliminates the corresponding risk of damage to the engine which may be caused by a service clip or rubber band being left in the engine. Rubber bands are small and have a color similar to oily metal, presenting a risk that a rubber band is left in the engine.

There is thus disclosed an improved retaining tool for exhaust brake power pistons. It will be appreciated that numerous changes may be made to the present invention without departing from the scope of the claims.

What is claimed is:

1. A retaining tool for retaining exhaust brake power pistons during service, the tool comprising:
- a generally C-shaped body, the body comprising a lower portion and an upper portion;
- a slot formed in the lower portion, the slot being configured for extending around the lower end of an exhaust brake power piston;
- a surface on the upper portion configured for resting on the top portion of the exhaust rocker arm of a diesel engine; and
- a finger grip formed on the upper portion, the finger grip comprising a loop extending upwardly from the upper portion.

2. The retaining tool of claim 1, wherein the tool is formed of a spring steel, and wherein the tool is stretched during placement on an exhaust rocker arm so as to place a compressive force on the exhaust brake power piston.

3. The retaining tool of claim 2, wherein the slot is formed in the end of the lower portion and opens outwardly along the length of the lower portion.

4. The retaining tool of claim 1, wherein at least a portion of the retaining tool is painted a bright color.

5. The retaining tool of claim 1, wherein the slot is configured for extending around a shaft between an exhaust brake power piston and a poppet.

6. A retaining tool for retaining exhaust brake power pistons during service, the tool comprising:
- a body formed from generally planar spring steel, the body being bent so as to form a 'C' shape, the body having a generally horizontal lower portion, a generally horizontal upper portion, and a middle portion therebetween;

a loop finger grip extending upwardly from the upper portion of the body;

a slot formed in the lower portion, the slot being configured for engaging a diesel engine exhaust brake power piston; and wherein the body is shaped such that, when the slot is engaging the power piston, the upper portion is in contact with a diesel exhaust rocker arm so as to place a compressive force on the rocker arm and power piston to retain the power piston in the rocker arm.

7. The retaining tool of claim 6, wherein the tool is colored with a high visibility color.

8. A retaining tool for retaining exhaust brake power pistons during service, the tool comprising:

a generally C-shaped body, the body comprising a lower portion and an upper portion;

a slot formed in the lower portion, the slot being attachable to the lower end of an exhaust brake power piston;

a surface on the upper portion configured for resting on the top portion of the exhaust rocker arm of a diesel engine; and a finger grip extending upwardly from the upper portion.

9. The retaining tool of claim 8, wherein the finger grip forms a loop.

10. The retaining tool of claim 8, wherein the tool is formed of a spring steel, and wherein the tool is stretched during placement on an exhaust rocker arm so as to place a compressive force on the exhaust brake power piston.

11. The retaining tool of claim 10, wherein the slot is formed in the end of the lower portion and opens outwardly along the length of the lower portion.

12. The retaining tool of claim 8, wherein at least a portion of the retaining tool is painted a bright color.

* * * * *